US012482942B2

(12) United States Patent
Hong et al.

(10) Patent No.: US 12,482,942 B2
(45) Date of Patent: Nov. 25, 2025

(54) ANTENNA STRUCTURE INCLUDING PATCH ANTENNA AND ELECTRONIC DEVICE INCLUDING SAME

(71) Applicant: SAMSUNG ELECTRONICS CO., LTD., Suwon-si (KR)

(72) Inventors: Yongeui Hong, Suwon-si (KR); Yonghyun Yoon, Suwon-si (KR); Youngjun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 142 days.

(21) Appl. No.: 18/299,916

(22) Filed: Apr. 13, 2023

(65) Prior Publication Data

US 2023/0246339 A1 Aug. 3, 2023

Related U.S. Application Data

(63) Continuation of application No. PCT/KR2022/011512, filed on Aug. 4, 2022.

(30) Foreign Application Priority Data

Sep. 27, 2021 (KR) ........................ 10-2021-0127326

(51) Int. Cl.
*H01Q 9/04* (2006.01)
*H01Q 1/42* (2006.01)

(52) U.S. Cl.
CPC ........... *H01Q 9/0414* (2013.01); *H01Q 1/422* (2013.01)

(58) Field of Classification Search
CPC ........ H01Q 9/0414; H01Q 1/422; H01Q 1/48; H01Q 1/243
See application file for complete search history.

(56) References Cited

U.S. PATENT DOCUMENTS 7,589,678 B2 9/2009 Perunka et al.
8,384,604 B2 * 2/2013 Niederkorn ............ H01Q 1/243 343/702

(Continued)

FOREIGN PATENT DOCUMENTS

CN 109378581 A 2/2019
CN 210489828 U 5/2020

(Continued)

OTHER PUBLICATIONS

Extended European Search Report dated Sep. 19, 2024 issued in European Patent Application No. 22873097.4.

(Continued)

*Primary Examiner* — Dieu Hien T Duong
(74) *Attorney, Agent, or Firm* — NIXON & VANDERHYE P.C.

(57) ABSTRACT

An electronic device according to an embodiment may include: a housing forming at least a part of an exterior of the electronic device; a printed circuit board (PCB) disposed in the housing; a dielectric layer disposed between the PCB and the housing and comprising a first surface facing a surface of the housing and a second surface facing the PCB; a patch antenna disposed on the first surface of the dielectric layer and electrically connected to a first point of the PCB; a conductive plate disposed adjacent to the second surface of the dielectric layer, connected to a ground on the PCB through a second point spaced apart from the first point, and overlapping with the patch antenna; and a wireless communication circuit electrically connected to the PCB, wherein the wireless communication circuit is configured to feed power to the patch antenna through the first point of the PCB to transmit or receive a first signal of a first frequency band, and to transmit and/or receive a second signal of a second frequency band different from the first frequency band (Continued)

through a first electric path including the patch antenna, the conductive plate, and the ground.

18 Claims, 13 Drawing Sheets

(56) References Cited

U.S. PATENT DOCUMENTS

| | | | | |
|---|---|---|---|---|
| 9,030,358 | B2 | 5/2015 | Chou | |
| 10,957,978 | B2 | 3/2021 | Cooper et al. | |
| 11,309,631 | B2 | 4/2022 | Iino | |
| 2006/0145923 | A1 * | 7/2006 | Autti | H01Q 9/0421 343/702 |
| 2011/0009594 | A1 | 1/2011 | Yoon et al. | |
| 2011/0095947 | A1 * | 4/2011 | Chou | H01Q 5/371 343/700 MS |
| 2020/0036083 | A1 | 1/2020 | Kim et al. | |
| 2021/0036426 | A1 | 2/2021 | Iino | |
| 2021/0143536 | A1 | 5/2021 | Park et al. | |

FOREIGN PATENT DOCUMENTS

| | | | |
|---|---|---|---|
| CN | 112310620 | | 2/2021 |
| CN | 113437477 | | 9/2021 |
| JP | 2005124056 | A | 5/2005 |
| JP | 2011030196 | A | 2/2011 |
| JP | 2017126837 | A | 7/2017 |
| KR | 20080056518 | A | 6/2008 |
| KR | 10-2020-0004870 | | 1/2020 |
| KR | 10-2020-0138637 | | 12/2020 |
| KR | 20210001976 | A | 1/2021 |
| KR | 20210056000 | A | 5/2021 |
| WO | 2020017670 | A1 | 1/2020 |

OTHER PUBLICATIONS

International Search Report for PCT/KR2022/011512 mailed Nov. 16, 2022, 5 pages.

Written Opinion of the ISA for PCT/KR2022/011512 mailed Nov. 16, 2022, 3 pages.

Korean Office Action dated Sep. 26, 2025 issued in Korean Patent Application No. 10-2021-0127326 and English translation, 20 pp.

* cited by examiner

ANTENNA STRUCTURE INCLUDING PATCH ANTENNA AND ELECTRONIC DEVICE INCLUDING SAME

CROSS-REFERENCE TO RELATED APPLICATIONS

This application is a continuation of International Application No. PCT/KR2022/011512 designating the United States, filed on Aug. 4, 2022, in the Korean Intellectual Property Receiving Office and claiming priority to Korean Patent Application No. 10-2021-0127326, filed on Sep. 27, 2021, in the Korean Intellectual Property Office, the disclosures of which are incorporated by reference herein in their entireties.

BACKGROUND

Field

The disclosure relates to an antenna structure including a patch antenna, and an electronic device including same.

Description of Related Art

To meet a demand for radio data traffic that is on an increasing trend after commercialization of a 4th-generation (4G) communication system, efforts to commercialize the next-generation (e.g., 5th generation (5G) or pre-5G) communication system have been made. As a part of the efforts, the next-generation communication system may be implemented in high-frequency band to achieve a high data transmission rate.

Specifically, an ultra-wide band (UWB) radio technology is a new radio technology utilized in communication, radar, or security using a very wide frequency band of several GHz or more in a baseband, instead of using a radio frequency carrier (RF carrier), and rapidly rises as a new next-generation radio technology since a frequency can be used without mutual inference with the conventional communication system of mobile communication, broadcasting or a satellite using very low spectrum power density such as noise in the conventional radio system. A UWB antenna is usually used for performing communication in 6 to 9 GHz high frequency bands, and thus a patch-type antenna has been adopted.

In addition, to support the 4G communications system, a laser direct structuring (LDS) antenna is also utilized, wherein the LDS antenna utilizes, as an antenna radiator, a conductive pattern obtained by forming a pattern to thermoplastic resin through laser and plating the corresponding pattern.

For the recently released mobile terminals, both an LDS antenna and a patch antenna need to be implemented in a mobile terminal in order to support both 4G communication and high-frequency bands such as UWB and mmWave. However, in implementing both the LDS antenna and the patch antenna, there may be a limitation in a mounting space in a mobile terminal, which may lead to constraints on utilization of spaces.

In addition, when the patch antenna and the LDS antenna are separately implemented, manufacturing processes and costs may increase.

SUMMARY

Embodiments of the disclosure may provide a multiband antenna through a single feed and ground structure.

An electronic device according to an example embodiment may include: a housing forming at least a part of an exterior of the electronic device, a printed circuit board (PCB) disposed in the housing, a dielectric layer including a first surface facing a surface of the housing and a second surface facing the PCB, and disposed between the PCB and the housing, a patch antenna disposed on the first surface of the dielectric layer and electrically connected to a first point of the PCB, a conductive plate disposed adjacent to the second surface of the dielectric layer and connected to a ground on the PCB through a second point spaced apart from the first point and overlapping with the patch antenna, and a wireless communication circuit electrically connected to the PCB, wherein the wireless communication circuit is configured to feed power to the patch antenna through the first point of the PCB to transmit or receive a first signal of a first frequency band, and to transmit and/or receive a second signal of a second frequency band different from the first frequency band through a first electric path including the patch antenna, the conductive plate, and the ground.

An antenna structure according to an example embodiment may include: a printed circuit board (PCB) including a ground, a wireless communication circuit electrically connected to the PCB, and an antenna module including an antenna electrically connected to the PCB, wherein the antenna module includes a dielectric layer disposed to be spaced apart from the PCB, wherein the dielectric layer includes a first surface and a second surface oriented in a direction opposite to the first surface and is adjacent to the PCB, a patch antenna disposed on the first surface of the dielectric layer and electrically connected to a first point of the PCB, and a conductive plate disposed adjacent to the second surface of the dielectric layer and electrically connected to the patch antenna, wherein the conductive plate is electrically connected to the ground through a second point spaced apart from the first point, wherein the wireless communication circuit is configured to feed power to the antenna module through the first point of the PCB to transmit or receive a first signal of a first frequency band through the patch antenna, and to transmit or receive a second signal of a second frequency band through a first electric path including the patch antenna, the conductive plate, and the ground, the second frequency band being different from the first frequency band.

According to various example embodiments of the disclosure, through a single feed and ground structure, a multiband antenna supporting 4G communication and high-frequency band communication can be implemented.

In addition, according to various example embodiments, by implementing an antenna supporting a multiband through a single antenna structure, manufacturing costs can be reduced and manufacturing processes can be simplified.

Furthermore, according to various example embodiments, by implementing an antenna supporting a multiband through a single antenna structure, a radiation performance of the antenna can be improved.

Various other effects directly or indirectly identified through the disclosure can be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar components may be denoted by the same or similar reference numerals.

DETAILED DESCRIPTION

Hereinafter, various example embodiments of the disclosure are described with reference to the accompanying drawings. However, it should be understood that the description is not intended to limit a specific embodiment, and includes various modifications, equivalents, and/or alternatives of the embodiments of the disclosure.

Figure 1:
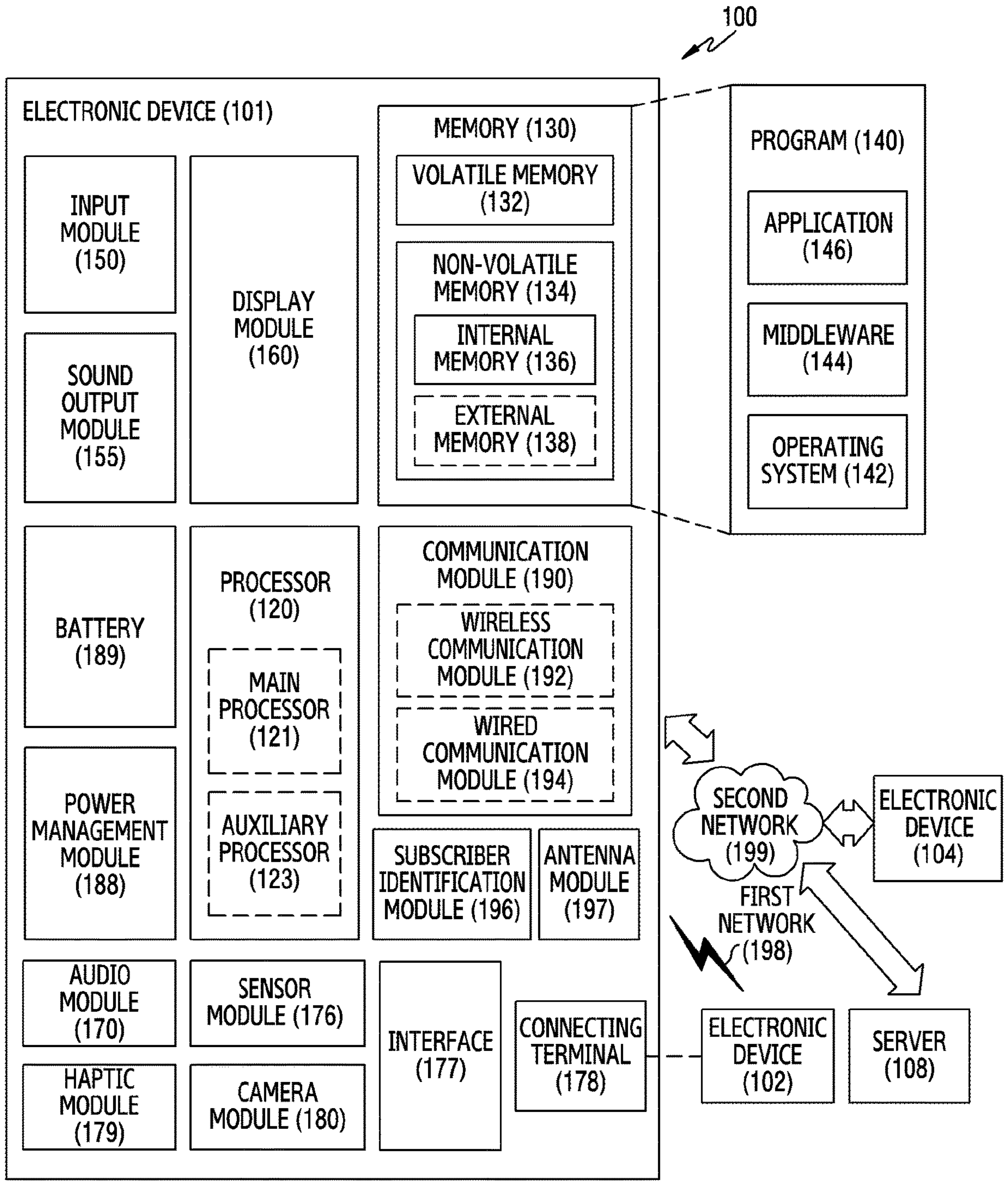
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image 25 signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
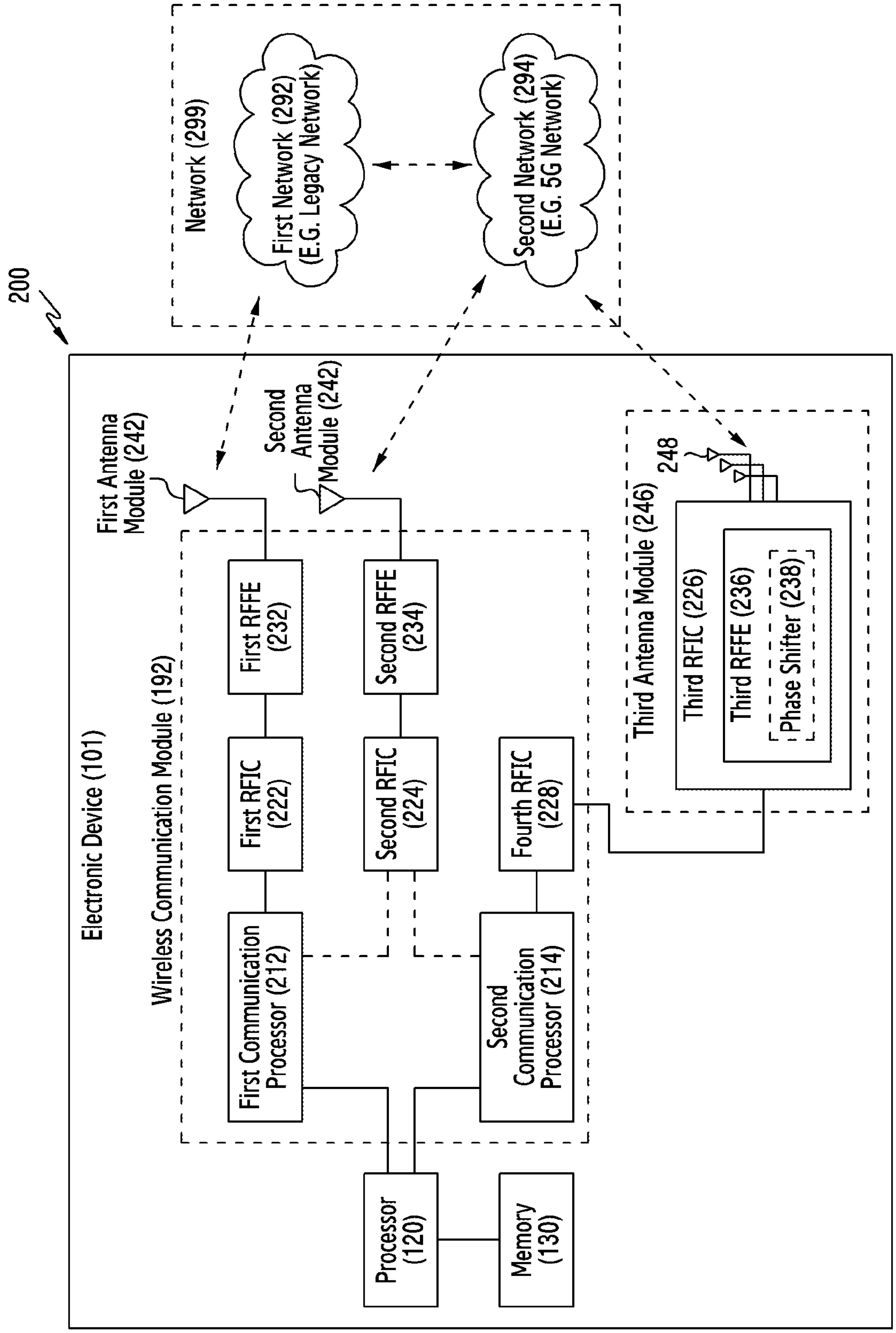
FIG. 2 is a block diagram illustrating an example configuration of an electronic device for supporting legacy network communication and 5G network communication according to various embodiments.

FIG. 2 is a block diagram 200 illustrating an example configuration of an electronic device 101 for supporting legacy network communication and 5G network communication according to various embodiments.

Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to an embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to an embodiment, the fourth RFIC 228 may be omitted or may be included as a portion of the third RFIC 226.

The first communication processor 212 may include various processing circuitry and can support establishment of a communication channel with a band to be used for wireless communication with the first cellular network 292 and legacy network communication through the established communication channel. According to various embodiments, the first cellular network may be a legacy network including a 2G, 3G, 4G, or Long-Term Evolution (LTE) network. The second communication processor 214 may include various processing circuitry and can support establishment of a communication channel corresponding to a designated band (e.g., about 6 GHZ~about 60 GHz) of a band to be used for wireless communication with the second cellular network 294 and 5G network communication through the established communication channel. According to various embodiments, the second cellular network 294 may be a 5G network that is defined in 3GPP. Further, according to an embodiment, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel. According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to an embodiment, the first communication processor 212 and the second communication processor 214 is directly or indirectly connected by an interface (not shown), thereby being able to provide or receive data or control signal in one direction or two directions.

The first RFIC 222, in transmission, can converts a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., about 6 GHz~about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first communication processor 214. According to an embodiment, the third RFFE 236 may be provided as a portion of the third RFIC 226.

The electronic device 101, according to an embodiment, may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted, or may be combined with another antenna module and can process RF signals in a plurality of bands.

According to an embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz~about 60 GHz), for example, which is used for 5G network communication, due to a transmission line. Accordingly, the electronic device 101 can improve the quality and the speed of communication with the second cellular network 294 (e.g., 5G network).

According to an embodiment, the antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-Stand Along (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

Figure 3A:
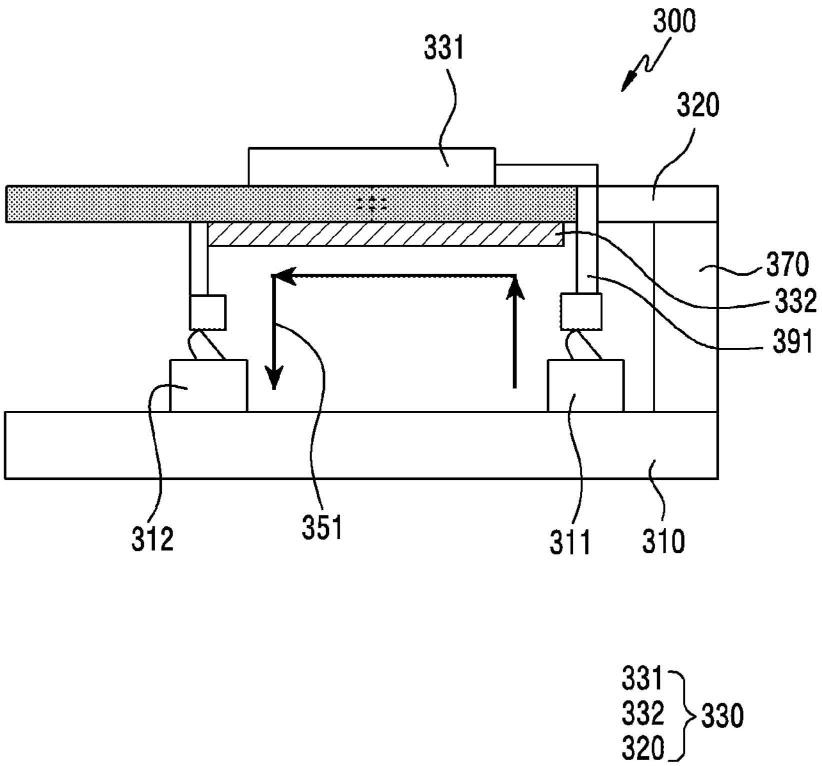
FIG. 3A is a sectional view illustrating an example antenna structure according to various embodiments.
Figure 3B:
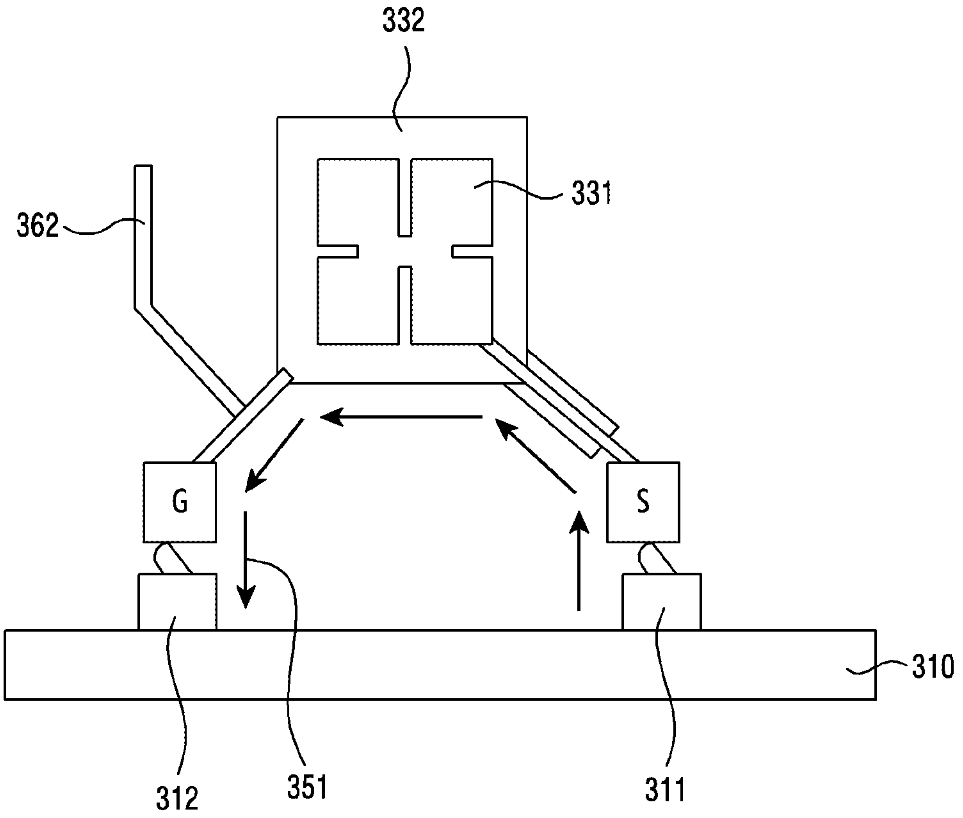
FIG. 3B is a diagram illustrating an electronic device including an antenna structure according to various embodiments.
Figure 3C:
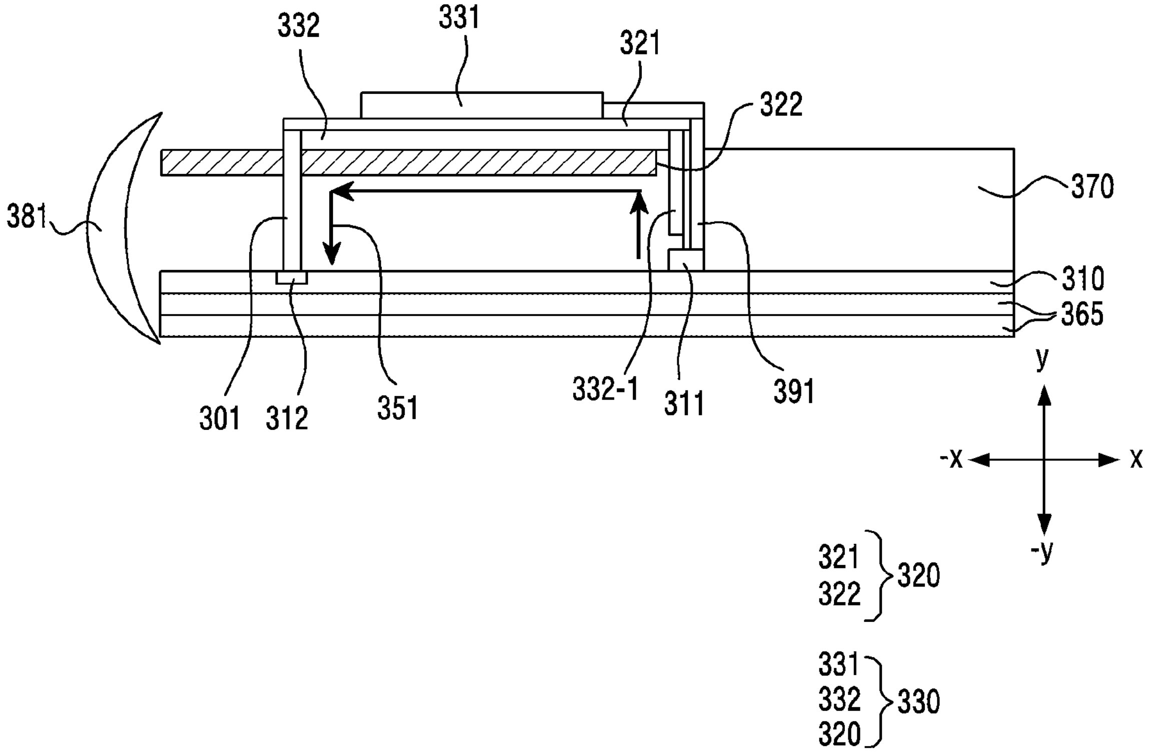
FIG. 3C is a diagram illustrating a lateral view of an antenna structure according to various embodiments.

FIG. 3A is a sectional view illustrating an example antenna structure according to various embodiments. FIG. 3B is a diagram illustrating an example electronic device including an antenna structure according to various embodiments. FIG. 3C is a diagram illustrating a lateral view of an antenna structure according to various embodiments.

Referring to FIGS. 3A, 3B and 3C (which may be referred to as FIGS. 3A to 3C), an antenna structure 300 disposed in a housing of an electronic device 101 may include a printed circuit board (PCB) 310, a dielectric layer 320, a patch antenna 331 disposed on one surface of the dielectric layer 320, a conductive plate 332 disposed adjacent to the other surface of the dielectric layer 320, and a shield can 370. At least a part (e.g., the shield can 370) of the above-described elements can be omitted, and another element can be added.

According to an embodiment, the antenna structure 300 may include an antenna module 330 including the patch antenna 331, the conductive plate 332, and the dielectric layer 320. For example, the antenna structure 300 may support communication of an ultra-wide band (UWB) through the patch antenna 331, and the antenna module 330 may be referred to as a UWB antenna module.

Referring to FIGS. 3A and 3B, the dielectric layer 320 according to an embodiment may be disposed to be spaced apart from the PCB 310. According to an embodiment, the dielectric layer 320 may have a predetermined (e.g., specified) air gap and disposed to be spaced apart from the PCB 310. According to an embodiment, the dielectric layer 320 may be disposed to be spaced apart from the PCB 310 by the shield can 370 being adjacent to at least partial area of the dielectric layer 320.

According to an embodiment, the dielectric layer 320 may include a first surface and a second surface that is in a direction opposite to the first surface and is adjacent to the PCB 310. According to an embodiment, the dielectric layer 320 may include a first surface facing one surface of the housing of the electronic device 101 and a second surface facing the PCB 310. According to an embodiment, the dielectric layer 320 may include a first surface on which the patch antenna 331 is disposed and a second surface facing the PCB 310.

According to an embodiment, the antenna structure 300 may include the patch antenna 331 disposed on the first surface of the dielectric layer 320. According to an embodiment, the patch antenna 331 may include multiple conductive patches arranged to be spaced apart from each other. A description there will be made below.

According to an embodiment, the patch antenna 331 may be electrically connected to a first point of the PCB 310. According to an embodiment, the patch antenna 331 may be electrically connected to the first point 311 of the PCB 310 through a conductive connecting member 391. For example, the patch antenna 331 may be electrically connected to the first point 311 of the PCB 310 through a conductive via, but the conductive connecting member 391 is not limited to the example above.

According to an embodiment, the antenna structure 300 may include a conductive plate 332 disposed adjacent to the second surface of the dielectric layer 320. According to an embodiment, the antenna structure 300 may include the conductive plate 332 disposed on the second surface of the dielectric layer 320. For example, the conductive plate 332 may be referred to as a thin film formed of a conductive material (e.g., copper), but is not limited thereto.

According to an embodiment, the conductive plate 332 may be disposed on the patch antenna 331. According to an embodiment, the conductive plate 332 may be disposed to overlap with at least partial area of the patch antenna 331. According to an embodiment, the conductive plate 332 may be disposed to be spaced apart from the patch antenna 331.

According to an embodiment, the conductive plate 332 may be electrically connected to the patch antenna 331. According to an embodiment, the conductive plate 332 and the patch antenna 331 may be electrically connected through coupling. According to an embodiment, the conductive plate 332 may operate as a ground in commutation through the patch antenna 331.

According to an embodiment, the conductive plate 332 may be connected to the ground at a second point 312 of the PCB 310. According to an embodiment, the second point 312 may be formed to be spaced apart from the first point 311. According to an embodiment, the PCB 310 may include a ground area, and the conductive plate 332 may be electrically connected to the ground area through the second point 312 of the PCB 310.

According to an embodiment, the antenna structure 300 may include a wireless communication circuit (e.g., the wireless communication module 192 of FIG. 1) electrically connected to the PCB 310. According to an embodiment, the wireless communication circuit may feed power to the antenna module 330 through the first point 311 of the PCB 310 to transmit and/or receive a signal of a designated frequency band. According to an embodiment, the wireless communication circuit may feed power to the antenna module 330 through the first point 311 of the PCB 310 to transmit and/or receive a first signal of a first frequency band (e.g., 6 GHz to 9 GHz) through the patch antenna 331, and transmit and/or receive a second signal of a second frequency band (e.g., 3 GHZ) different from the first frequency band through a first electric path 351 including the patch antenna 331, the conductive plate 332, and the ground.

According to an embodiment, the wireless communication circuit may feed power to the patch antenna 331 through the first point 311 of the PCB 310. According to an embodiment, the wireless communication circuit may feed power to the patch antenna 331 through the first point 311 of the PCB 310 to transmit and/or receive the first signal of the first frequency band. For example, the wireless communication circuit may feed power to the patch antenna 331 through the first point 311 to transmit and/or receive an about 6 GHz to 9 GHz ultra-wide band (UWB) signal. In another example, the wireless communication circuit may feed power to the patch antenna 331 through the first point 311 to transmit and/or receive an about 28 GHz mmWave band signal. However, the signal transmitted and/or received through the patch antenna 331 is not limited to the signal of the frequency band in the above-described example, and may be referred to as signals of various frequency bands.

According to an embodiment, the wireless communication circuit may feed power to the patch antenna 331 through the first point 311 to radiate the first signal in the direction perpendicular to the first face of the dielectric layer 320.

According to an embodiment, the wireless communication circuit may feed power to the patch antenna 331 through the first point 311 of the PCB 310 to feed power to the conductive plate 332 through coupling feeding. According to an embodiment, the wireless communication circuit may feed power to the patch antenna 331 through the first point 311 of the PCB 310 to form the first electric path 351 including the patch antenna 331, the conductive plate 332, and the ground, and transmit and/or receive a second signal of a second frequency band different from the first frequency band through the first electric path 351. According to an embodiment, when wireless communication circuit feeds power to the patch antenna 331 through the first point 311, the conductive plate 332 may operate a coupling antenna element. For example, the wireless communication circuit may feed power to the patch antenna 331 through the first point 311 to form the first electric path 351 including the patch antenna 331, the conductive plate 332, and the ground, and to transmit and/or receive an about 4 GHz long-term evolution (LTE) signal through the first electric path 351. However, the second frequency band of the second signal transmitted and/or received by the wireless communication circuit through the first electric path 351 is not limited to the above-described example.

According to an embodiment, the first electric path 351 including the patch antenna 331, the conductive plate 332, and the ground may operate as a loop antenna.

Referring to FIG. 3C, the dielectric layer 320 according to an embodiment may include a first dielectric layer 321 on which the patch antenna 331 is safely mounted and a second dielectric layer 322 on which the conductive plate 332 is disposed. For example, the dielectric layer 320 may include a flexible printed circuit board (FPCB) on which the patch antenna 331 is safely mounted, and a non-conductive antenna carrier or an injector on which the conductive plate 332 is disposed. According to an embodiment, the dielectric layer 320 may include at least one of the FPCB on which the patch antenna 331 is safely mounted and an LDS carrier on which the conductive plate 332 is disposed. According to an embodiment, the dielectric layer 320 may be referred to as a layer having a first dielectric layer 321 (e.g., FPCB) and a second dielectric layer 322 (e.g., LDS carrier) integrally formed thereinto, wherein the first dielectric layer has the patch antenna 331 safely mounted thereon and the second dielectric layer has the conductive plate 332 disposed thereon.

According to an embodiment, the conductive plate 332 may be electrically connected to the second point 312 of the PCB 310 through a connecting member 301. According to an embodiment, the conductive plate 332 may be electrically connected to the ground formed at the second point 312 of the PCB 310 through the connecting member 301.

According to an embodiment, the conductive plate 332 may be formed to be spaced apart from the first point 311 of the PCB 310. According to an embodiment, the conductive plate 332 may include an extension unit 332-1 extending toward the PCB 310. According to an embodiment, the extension unit 332-1 of the conductive plate 332 may be formed to be spaced apart from the first point 311 of the PCB 310.

According to an embodiment, the antenna module 330 disposed in the electronic device 101 may be disposed adjacent to at least a part of a side frame 381. According to an embodiment, the PCB 310 may be disposed adjacent to a display 365 of the electronic device 101. With respect to the antenna module 330 according to an embodiment, the patch antenna 331 may be disposed to be oriented in the direction (e.g., +y direction) opposite to the direction in which the display 365 is oriented. According to an embodiment, the wireless communication circuit feeds power to the patch antenna 331 through the first point 311 to radiate a first signal toward the first surface of the dielectric layer 320 and a rear direction (e.g., +y direction) of the electronic device 101.

Figure 4A:
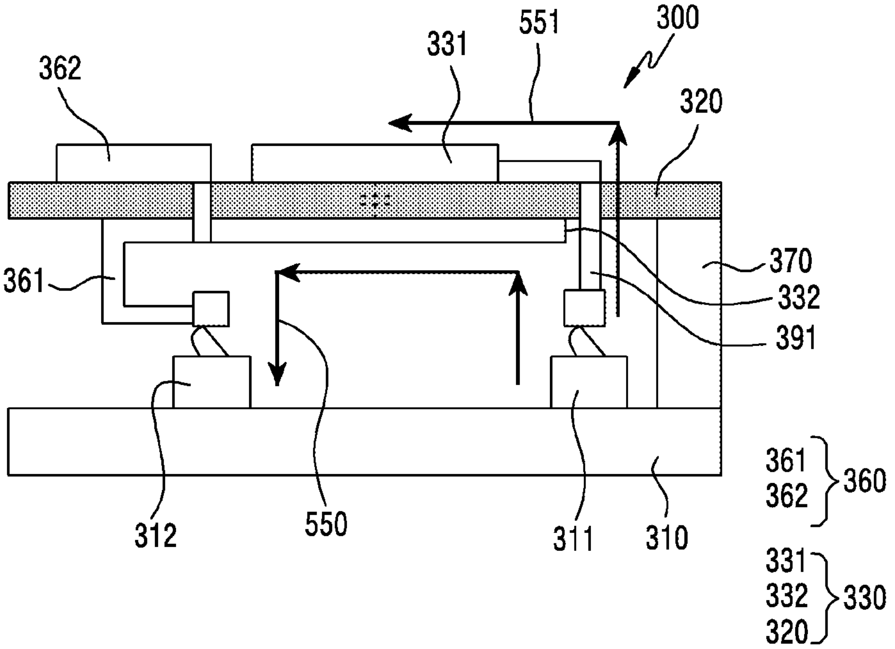
FIG. 4A is a sectional view illustrating an example antenna structure including a conductive member according to various embodiments.
Figure 4B:
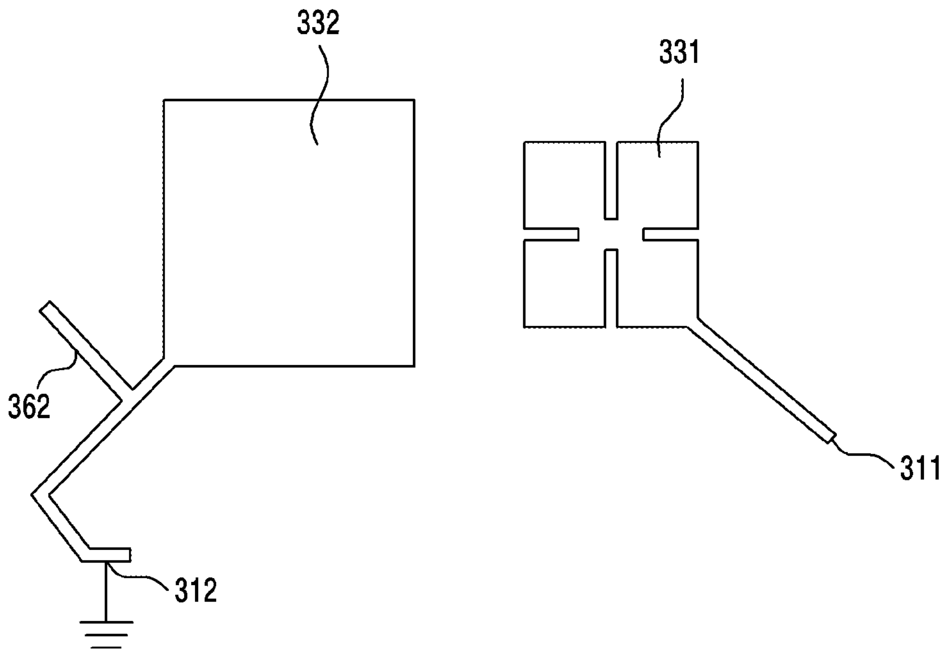
FIG. 4B is a diagram illustrating an example patch antenna and a conductive plate including a conductive member according to various embodiments.
Figure 4C:
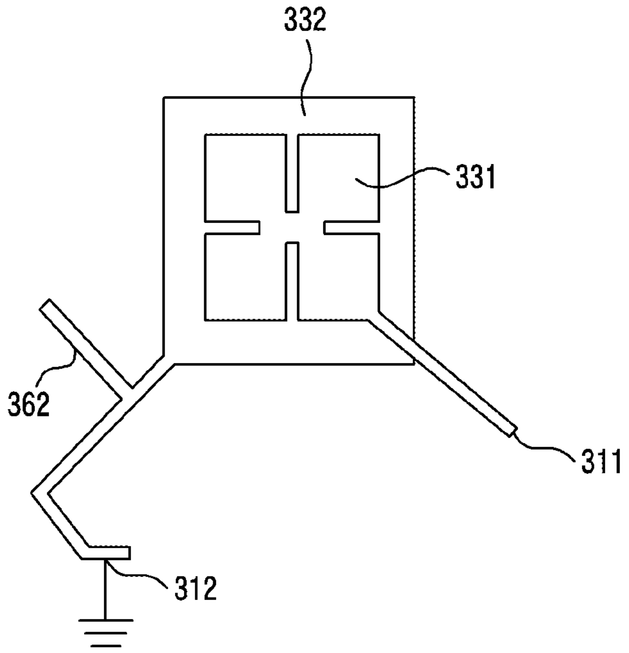
FIG. 4C is a diagram illustrating an example patch antenna and a conductive plate including a conductive member according to various embodiments.

FIG. 4A is a sectional view illustrating an example antenna structure including a conductive member according to various embodiments. FIG. 4B is a diagram illustrating a patch antenna and a conductive plate including a conductive member according to various embodiments. FIG. 4C illustrates example structures of a patch antenna and a conductive plate including a conductive member according to various embodiments.

Referring to FIGS. 4A, 4B and 4C (which may be referred to as FIGS. 4A to 4C), according to an embodiment, an antenna structure 300 disposed in a housing of an electronic device 101 may include a PCB 310, a dielectric layer 320, a patch antenna 331 disposed on one surface of the dielectric layer 320, a conductive plate 332 disposed adjacent to the other surface of the dielectric layer 320, and a conductive member 360 extending from the conductive plate 332. The same reference numeral is used for the same or substantially same element as the above-described element, and a redundant description is omitted.

According to an embodiment, a wireless communication circuit (e.g., the wireless communication module 192 of FIG. 1) may feed power to the patch antenna 331 through a first point 311 of the PCB 310. According to an embodiment, as the wireless communication circuit feeds power to the patch antenna 331 through the first point 311, a signal of a first frequency band (e.g., 6 GHz to 9 GHz) may be transmitted and/or received.

According to an embodiment, the wireless communication circuit may feed power to the patch antenna 331 through an electric path 551. According to an embodiment, the wireless communication circuit may feed power to the patch antenna 331 through the first point 311 to form the electric path 551 including the conductive connecting member 391 and the patch antenna 331, and transmit and/or receive a signal of a first frequency band through the electric path 551.

According to an embodiment, the conductive plate 332 operating as a ground for the patch antenna 331 and the conductive member 360 electrically connected to the conductive plate 332 may operate a coupling antenna element resonating in a second frequency band and a third frequency band. According to an embodiment, as the wireless communication circuit feeds power to the patch antenna 331 through the first point, the conductive plate 332 and the conductive member 360 electrically connected to the conductive plate 332 operate as a coupling antenna element, and an electric path 550 including the conductive plate 332, the conductive member 360, and the ground is formed, and thus a third signal of a second frequency band (e.g., 4 GHZ) and/or a third frequency band (e.g., 2 GHZ) different from a first frequency band (e.g., 6 GHz to 9 GHz) may be transmitted and/or received. According to an embodiment, the wireless communication circuit may feed power to the patch antenna 331 through the first point 311 so as to form an emission current of a resonance frequency band through the patch antenna 331, the conductive plate 332, the conductive member 560, and the ground to transmit and/or receive a signal of a designated frequency band (e.g., 2 GHZ).

According to an embodiment, the electric path 550 including the patch antenna 331, the conductive plate 332, the conductive member 360, and the ground may operate as an inverted-F antenna (IFA) and a planar inverted-F antenna (PIFA). According to an embodiment, the antenna module 330 further includes the conductive member 360, so that the electric length of the electric path 550 including the patch antenna 331, the conductive plate 332, and the ground and operating as a loop antenna may be changed. According to an embodiment, the antenna module 330 further includes the conductive member 360, so that the electric length of the electric path 550 including the patch antenna 331, the conductive plate 332, and the ground may be changed, and accordingly, a resonance frequency of a signal transmitted or received through the electric path 550 may be changed. A detailed description will be made below.

According to an embodiment, the conductive member 360 may include a first conductive member 361 extending from the conductive plate 332 and disposed adjacent to the second surface of the dielectric layer 320 and/or a second conductive member 362 disposed on the first surface of the dielectric layer 320.

Referring to FIGS. 4A and 4B, the conductive member 360 according to an embodiment may include the second conductive member 362 extending from the conductive plate 332 and disposed adjacent to the second surface of the dielectric layer 320.

According to an embodiment, the wireless communication circuit may feed power to the patch antenna 331 through the first point 311 of the PCB 310 to form the electric path 550 including the conductive plate 332, the second conductive plate 362, and the ground and transmit and/or receive a third signal of a third frequency band (e.g., 2 GHZ) different from the first frequency band (e.g., 6 GHz to 9 GHz) and the second frequency band (e.g., 4 GHZ), through the electric path 550.

Referring to FIGS. 4A and 4C, the conductive member 360 according to an embodiment may include the second conductive member 362 extending from the conductive plate 332 and disposed on the first surface of the dielectric layer 320. According to an embodiment, the wireless communication circuit may feed power to the patch antenna 331 through the first point 311 of the PCB 310 to form the electric path 550 including the conductive plate 332, the second conductive member 362, and the ground and transmit and/or receive a fourth signal of a fourth frequency band (e.g., 2.5 GHZ) different from the first frequency band (e.g., 6 GHz to 9 GHz) and the second frequency band (e.g., 4 GHZ), through the electric path 550.

Figure 5:
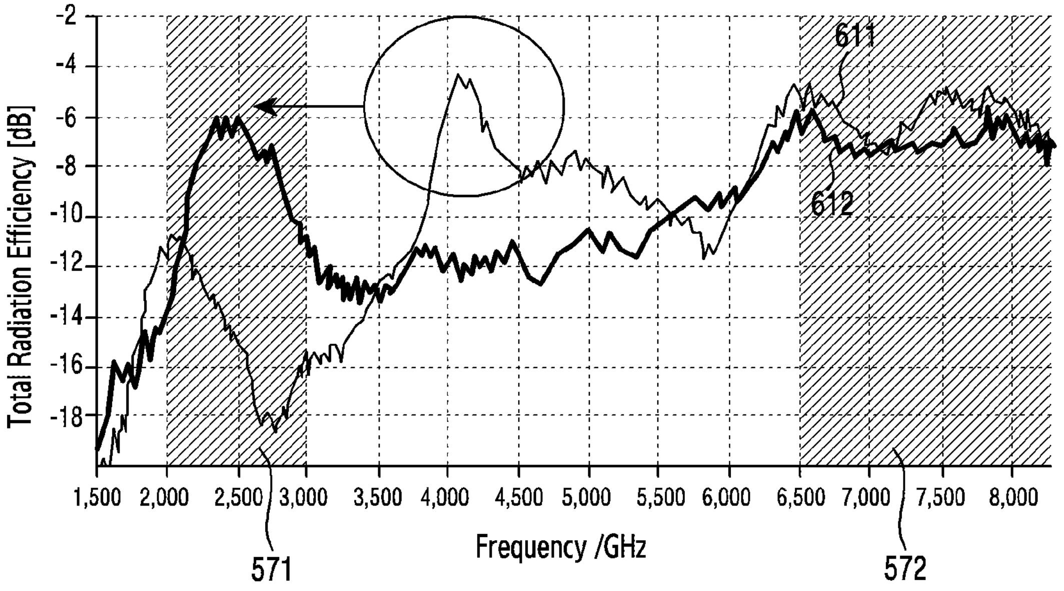
FIG. 5 is a graph illustrating radiation efficiency through an antenna structure including a conductive member according to various embodiments.

FIG. 5 is a graph illustrating radiation efficiency through an antenna structure including a conductive member according to various embodiments.

Referring to FIG. 5, when an antenna structure (e.g., the antenna structure 300 of FIG. 3A) including a conductive member (e.g., the conductive member 360 of FIG. 4A) radiates an RF signal, the antenna structure may have a resonance frequency that is different from that in a case where an antenna structure does not include the conductive member 360.

According to an embodiment, when the antenna structure not including the conductive member radiates an RF signal, radiation efficiency may be referred to as first radiation efficiency 611. According to an embodiment, when the antenna structure including the conductive member radiates an RF signal, radiation efficiency may be referred to as second radiation efficiency 612.

According to an embodiment, the first radiation efficiency 611 and the second radiation efficiency 612 may have the maximum radiation efficiency in a second frequency band 572 (e.g., an ultra-wide band (UWB)). When the antenna structure according to an embodiment radiates an RF signal, resonance may occur in a first frequency band 571 (e.g., a Wi-Fi band) and/or the second frequency band 572 (e.g., the UWB).

According to an embodiment, with respect to the first radiation efficiency 611 in a case where the antenna structure not including the conductive member radiates an RF signal, the resonance may occur in an about 4 GHz frequency band. According to an embodiment, the first radiation efficiency 611 in the case where the antenna structure not including the conductive member radiates an RF signal may have the maximum radiation efficiency in the about 4 GHz frequency band.

According to an embodiment, with respect to the second radiation efficiency 612 in a case where the antenna structure including the conductive member radiates an RF signal, the resonance may occur the first frequency band 571 (e.g., the Wi-Fi band). For example, with respect to the second radiation efficiency 612 in the case where the antenna structure including the conductive member radiates an RF signal, the resonance may occur in an about 2.5 GHz frequency band. According to an embodiment, the second radiation efficiency 612 in the case where the antenna structure including the conductive member radiates an RF signal may have the maximum radiation efficiency in the first frequency band 571. For example, the second radiation efficiency 612 may have the maximum radiation efficiency in the about 2.5 GHz frequency band.

According to an embodiment, the antenna structure includes the conductive member so that the resonance frequency having the maximum radiation efficiency is changed from about 4 GHz to about 2.5 GHz.

Figure 6:
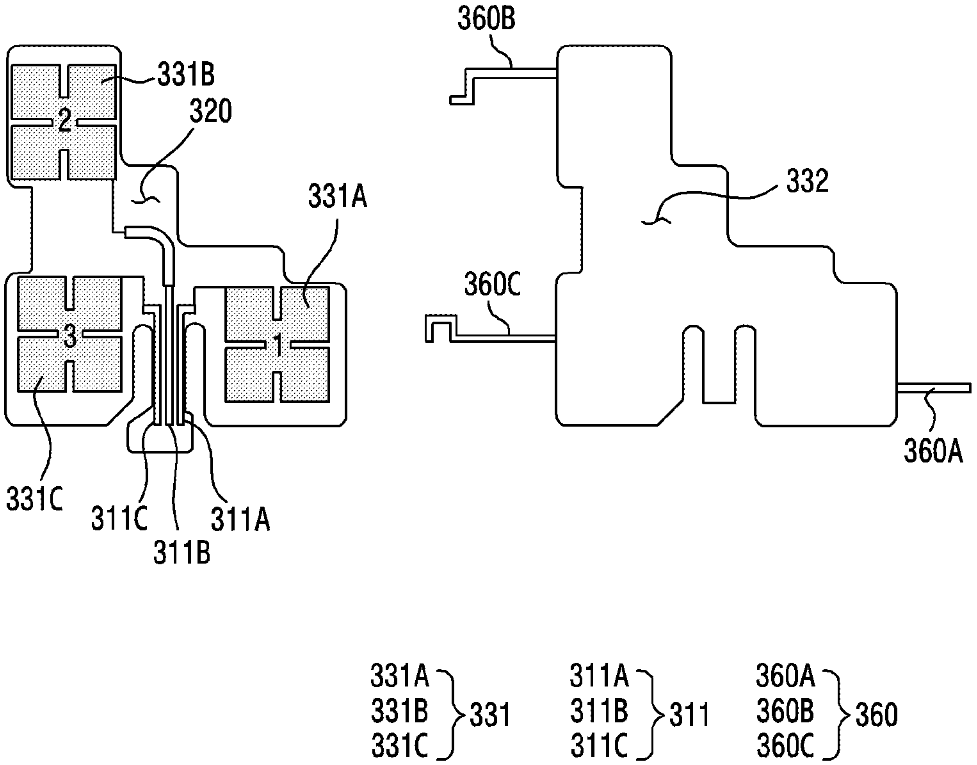
FIG. 6 is a diagram illustrating an antenna structure including multiple antenna radiators according to various embodiments.

FIG. 6 is a diagram illustrating an example antenna structure including multiple antenna radiators according to various embodiments.

Referring to FIG. 6, an antenna structure 300 according to an embodiment may include multiple conductive patches 331A, 331B, and 331C and multiple conductive members 360A, 360B, and 360C. According to an embodiment, the antenna structure 330 may include a dielectric layer 320, multiple conductive patches 331A, 331B, and 331C arranged on the dielectric layer 320, and a conductive plate 332 disposed under the dielectric layer 320.

According to an embodiment, the dielectric layer 320 may be formed of a polyimide (PI) film, but is not limited thereto.

According to an embodiment, a patch antenna (e.g., the patch antenna 331 of FIG. 3A) included in the antenna structure 300 may include the multiple conductive patches 331A, 331B, and 331C. According to an embodiment, the multiple conductive patches 331A, 331B, and 331C may be arranged to be spaced apart from each other on one surface of dielectric layer 320. According to an embodiment, the respective conductive patches 331A, 331B, and 331C may be arranged to be spaced apart from each other at a regular interval. According to an embodiment, the respective conductive patches 331A, 331B, and 331C may be arranged to be spaced apart from each other at an about half-wavelength regular, and may be arranged in the shape of a right-angled triangle or the shape closer to a right-angled triangle. However, the arrangement of the multiple conductive patches 331A, 331B, and 331C is not limited to the above-described example.

According to an embodiment, a wireless communication circuit may feed power to the multiple conductive patches 331A, 331B, and 331C through a feeding point 311 to transmit and/or receive a signal of a designated frequency band. According to an embodiment, the wireless communication circuit may feed power to each of the multiple conductive patches 331A, 331B, and 331C through each of feeding points 311A, 311B, and 311C to transmit and/or receive a signal of a designated frequency band. For example, the wireless communication circuit may feed power to a first conductive patch 331A through a first feeding point 311A to transmit and/or receive a signal of a designated frequency band. According to an embodiment, the multiple conductive patches 331A, 331B, and 331C may be used to transmit or receive a signal of a UWB band. For example, the UWB band may be referred to as an about 3.1 GHz or 10.6 GHz frequency band, but is not limited thereto.

According to an embodiment, the conductive plate 332 may be electrically connected to the first conductive patch 331A through coupling. According to an embodiment, the wireless communication circuit may feed power to the first conductive patch 331A through the first feeding point 311A to transmit and/or receive a signal (e.g., a Wi-Fi signal) of a designated frequency band through an electric path including the conductive plate 332 electrically connected with the first conductive patch 331A. However, the conductive patch and the first feeding point are not limited to the first feeding point 311A and the first conductive patch 331A, and may be referred to as one or multiple conductive patches 331A, 331B, and 331C at the multiple feeding points 311A, 311B, and 311C.

According to an embodiment, the antenna structure 300 may include multiple conductive members 360A, 360B, and 360C arranged locations corresponding to conductive patches 331A, 331B, and 331C, respectively. According to an embodiment, each of the multiple conductive members 360A, 360B, and 360C may be referred to as the conductive member 360 of FIG. 4A.

Figure 7A:
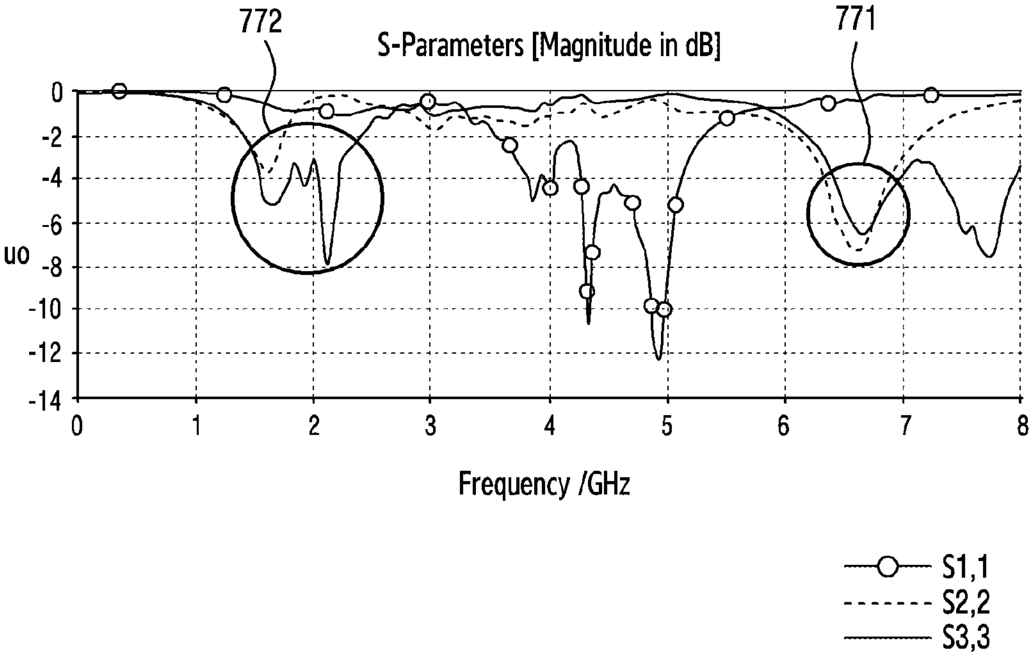
FIG. 7A is a graph illustrating signal radiation performance through an antenna structure in an area corresponding to, for example, a first conductive patch of FIG. 6 according to various embodiments.
Figure 7B:
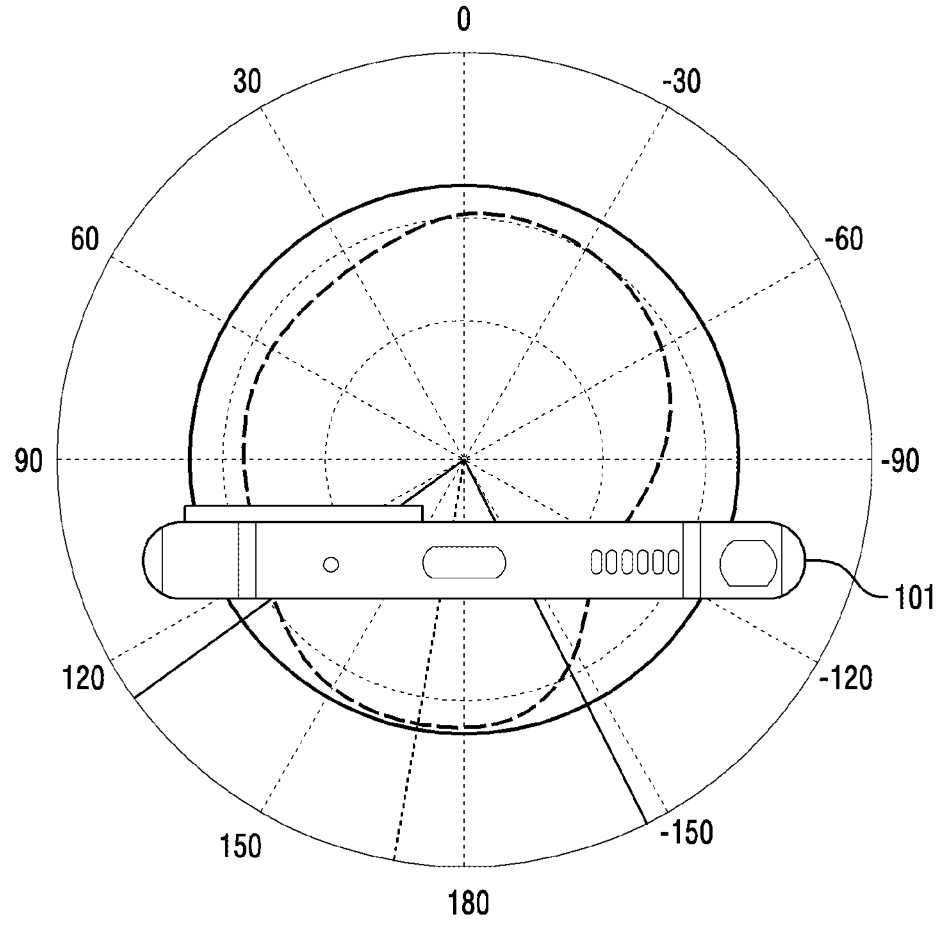
FIG. 7B is a graph illustrating a signal radiation result of a first frequency band according to various embodiments.
Figure 7C:
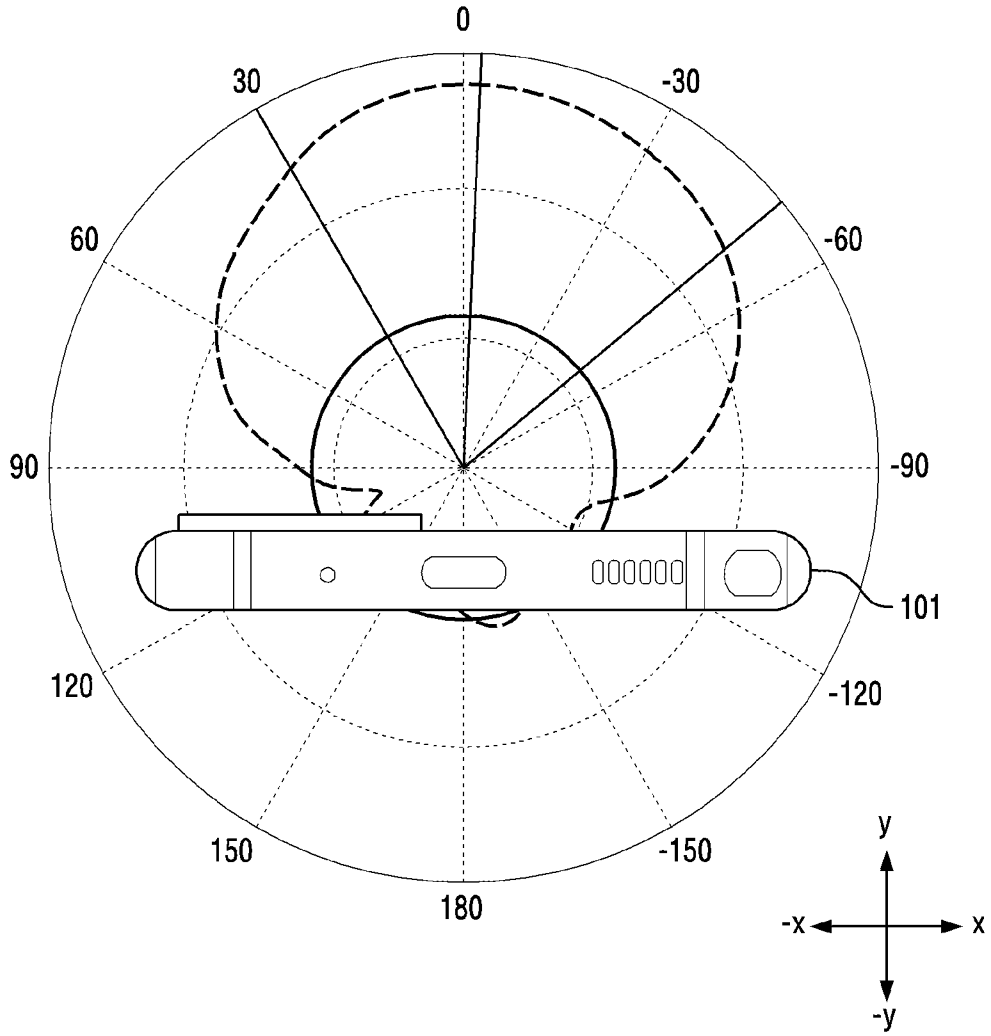
FIG. 7C is a graph illustrating a signal radiation result of a second frequency band according to various embodiments.

FIG. 7A is a graph illustrating signal radiation performance through an antenna structure in an area corresponding to, for example, the first conductive patch of FIG. 6 according to various embodiments. FIG. 7B is a graph illustrating a signal radiation result of a first frequency band according to various embodiments. FIG. 7C is a graph illustrating a signal radiation result of a second frequency band according to various embodiments.

Referring to FIGS. 7A, 7B and 7C (which may be referred to as FIGS. 7A to 7C), a radiation result and a radiation performance according to a frequency band of a signal transmitted and/or received through an antenna structure (e.g., the antenna structure 300 of FIG. 3A) may be identified according to an embodiment.

According to an embodiment, the radiation performance of the antenna structure may be adjusted according to the length of each of multiple conductive members 360.

According to an embodiment, a wireless communication circuit (e.g., the wireless communication module 192 of FIG. 1) may transmit and/or receive a first signal of a first frequency band 771 and a second signal of a second frequency band 772 through an antenna structure 300. For example, the wireless communication circuit may feed power to an antenna module 330 through a first point 311 of a PCB 310 to transmit and/or receive a UWB signal of a 6 GHz to 9 GHz through a patch antenna 331, and to transmit and/or receive a signal of a 2 GHz band through a first electric path 351.

Referring to FIGS. 7A to 7C, the wireless communication circuit may feed power to an antenna module (e.g., the antenna module 330 of FIG. 3A) to radiate the first signal of the first frequency band (e.g., 6 GHz to 9 GHz) and the second signal of the second frequency band (e.g., 2 GHZ).

According to an embodiment, the wireless communication circuit may feed power to the patch antenna 331 of the antenna module to radiate the first signal of the first frequency band in the rear direction (e.g., +y direction) of the electronic device 101. For example, the wireless communication circuit may feed power to the antenna module 330 included in the antenna structure 300 to transmit and/or receive the UWB signal of a 6 GHz to 9 GHz UWB through the patch antenna 331.

According to an embodiment, the wireless communication circuit may feed power to a conductive plate 332 through the first point 311 of the PCB 310 to for the first electric path 351 and radiate the second signal of the second frequency band. For example, the wireless communication circuit may feed power to the antenna module 330 included in the antenna structure 300 to transmit and/or receive a 2 GHz band LTE signal through the first electric path 351. However, the first signal and/or the second signal are not limited to the above-described example, and may be referred to as radio frequency (RF) signals of various frequency bands.

An electronic device according to an example embodiment may include: a housing forming at least a part of an exterior of the electronic device, a printed circuit board (PCB) disposed in the housing, a dielectric layer including a first surface facing a surface of the housing and a second surface facing the PCB, and disposed between the PCB and the housing, a patch antenna disposed on the first surface of the dielectric layer and electrically connected to a first point of the PCB, a conductive plate disposed adjacent to the second surface of the dielectric layer, connected to a ground on the PCB through a second point spaced apart from the first point, and overlapping with the patch antenna, and a wireless communication circuit (e.g., the wireless communication module 192 of FIG. 1) electrically connected to the PCB, wherein the wireless communication circuit is configured to feed power to the patch antenna through the first point of the PCB to transmit or receive a first signal of a first frequency band, and to transmit and/or receive a second signal of a second frequency band different from the first frequency band through a first electric path including the patch antenna, the conductive plate, and the ground.

According to an example embodiment, the electronic device may include: a first conductive member comprising a conductive material extending from the conductive plate and disposed adjacent to the second surface, wherein the wireless communication circuit is configured to feed power to the patch antenna through the first point to transmit or receive a third signal of a third frequency band through a second electric path including the patch antenna, the conductive plate, the first conductive member, and the ground, the third frequency band being different from the first frequency band and the second frequency band.

According to an example embodiment, the electronic device may include: a second conductive member comprising a conductive material extending from the conductive plate and disposed to be spaced apart from the patch antenna on the first surface, wherein the wireless communication circuit is configured to feed power to the patch antenna through the first point to transmit or receive a fourth signal of a fourth frequency band through a third electric path including the patch antenna, the conductive plate, the second conductive member, and the ground, the fourth frequency band being different from the first frequency band and the second frequency band.

According to an example embodiment, the electronic device may include: an antenna module including the patch antenna, the dielectric layer, and the conductive plate.

According to an example embodiment, the patch antenna and the conductive plate may be electrically connected to each other through coupling.

According to an example embodiment, on the first electric path, power may be configured to be fed to the conductive plate from the patch antenna through coupling, and the first electric path including the patch antenna, the conductive plate, and the ground may be configured to operate as a loop antenna.

According to an example embodiment, the second electric path including the patch antenna, the conductive plate, the first conductive member, and the ground may be configured to operate as an inverted-F antenna (IFA).

According to an example embodiment, the dielectric layer may include a flexible printed circuit board (FPCB) on which the patch antenna is mounted, and a laser directed structure (LDS) carrier having the conductive plate disposed adjacent thereto.

According to an example embodiment, the first frequency band may include a 6 GHz ultra-wide band (UWB) frequency band.

According to an example embodiment, the second frequency band may include a 4 GHz frequency band.

According to an example embodiment, the third frequency band may include a 2 GHz long-term evolution (LTE) frequency band.

According to an example embodiment, the patch antenna may include multiple patches, and the multiple patches may be arranged to be spaced apart from each other at a regular interval on the first surface of the dielectric layer.

According to an example embodiment, the patch antenna may be electrically connected to the first point by a conductive connecting member comprising a conductive material.

According to an example embodiment, the conductive connecting member may include a conductive via.

According to an example embodiment, the electronic device may further include: a shield can having at least partial area disposed adjacent to the dielectric layer, wherein the shield can is configured to provide electric shielding for electronic components arranged in a space formed by the shield can and the housing.

An antenna structure according to an example embodiment may include a printed circuit board (PCB) including a ground, a wireless communication circuit electrically connected to the PCB, and an antenna module including an antenna electrically connected to the PCB, wherein the antenna module includes a dielectric layer disposed to be spaced apart from the PCB, wherein the dielectric layer includes a first surface and a second surface oriented in a direction opposite to the first surface and is adjacent to the PCB, a patch antenna disposed on the first surface of the dielectric layer and electrically connected to a first point of the PCB, and a conductive plate disposed adjacent to the second surface of the dielectric layer and electrically connected to the patch antenna, wherein the conductive plate is electrically connected to the ground through a second point spaced apart from the first point, wherein the wireless communication circuit is configured to feed power to the antenna module through the first point of the PCB to transmit or receive a first signal of a first frequency band through the patch antenna, and to transmit or receive a second signal of a second frequency band through a first electric path including the patch antenna, the conductive plate, and the ground, the second frequency band being different from the first frequency band.

According to an example embodiment, the antenna structure may include a conductive member comprising a conductive material extending from the conductive plate and disposed adjacent to the second surface, and the wireless communication circuit is configured to feed power to the patch antenna through the first point to transmit or receive a third signal of a third frequency band through a second electric path including the patch antenna, the conductive plate, the conductive member, and the ground, the third frequency band being different from the first frequency band and the second frequency band.

According to an example embodiment, the first frequency band may include an ultra-wide band (UWB) frequency band, and the second frequency band may include a frequency band lower than the first frequency band.

According to an example embodiment, the patch antenna and the conductive plate may be electrically connected to each other through coupling, and the first electric path including the patch antenna, the conductive plate, and the ground may be configured to operate as a loop antenna.

According to an example embodiment, the patch antenna may include multiple patches, wherein the multiple patches are arranged to be spaced apart from each other at a regular interval on the first surface of the dielectric layer.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing forming at least a part of an exterior of the electronic device;

a printed circuit board (PCB) disposed in the housing;

a dielectric layer disposed between at least the PCB and the housing, wherein the dielectric layer comprises a first surface facing a surface of the housing and a second surface facing the PCB;

a patch antenna disposed on the first surface of the dielectric layer and electrically connected to a first point of the PCB;

a conductive plate disposed adjacent to the second surface of the dielectric layer and overlapping with the patch antenna, wherein the conductive plate is connected to a ground on the PCB through a second point spaced apart from the first point;

a first conducti comprising a conductive material, extending from the conductive plate and disposed adjacent to the second surface; and a wireless communication circuit, comprising processor circuitry, electrically connected to the PCB, wherein the wireless communication circuit is configured to feed power to the patch antenna through the first point of the PCB to:

transmit and/or receive a first signal of a first frequency band;

transmit and/or receive a second signal of a second frequency band different from the first frequency band through a first electric path comprising the patch antenna, the conductive plate, and the ground; and feed power to the patch antenna through the first point to transmit and/or receive a third signal of a third frequency band through a second electric path comprising the patch antenna, the conductive plate, the first conductive member, and the ground, the third frequency band being different from the first frequency band and the second frequency band.

2. The electronic device of claim 1, further comprising: a second conductive member comprising a conductive material extending from the conductive plate and disposed to be spaced apart from the patch antenna on the first surface, wherein the wireless communication circuit is configured to feed power to the patch antenna through the first point to transmit or receive a fourth signal of a fourth frequency band through a third electric path comprising the patch antenna, the conductive plate, the second conductive member, and the ground, the fourth frequency band being different from the first frequency band and the second frequency band.

3. The electronic device of claim 1, further comprising an antenna module comprising the patch antenna, the dielectric layer, and the conductive plate.

4. The electronic device of claim 1, wherein the patch antenna and the conductive plate are electrically connected to each other through coupling.

5. The electronic device of claim 4, wherein on the first electric path, power is configured to be fed to the conductive plate from the patch antenna through coupling, and wherein the first electric path comprising the patch antenna, the conductive plate, and the ground is configured to operate as a loop antenna.

6. The electronic device of claim 1, wherein the second electric path comprising the patch antenna, the conductive plate, the first conductive member, and the ground is configured to operate as an inverted-F antenna (IFA).

7. The electronic device of claim 1, wherein the dielectric layer comprises a flexible printed circuit board (FPCB) on which the patch antenna is mounted, and a laser directed structure (LDS) carrier having the conductive plate disposed adjacent thereto.

8. The electronic device of claim 1, wherein the first frequency band comprises a 6 GHz ultra-wide band (UWB) frequency band.

9. The electronic device of claim 8, wherein the second frequency band comprises a 4 GHz frequency band.

10. The electronic device of claim 1, wherein the third frequency band comprises a 2 GHz long-term evolution (LTE) frequency band.

11. An electronic device comprising:
- a housing forming at least a part of an exterior of the electronic device;
- a printed circuit board (PCB) disposed in the housing;
- a dielectric layer disposed between at least the PCB and the housing, wherein the dielectric layer comprises a first surface facing a surface of the housing and a second surface facing the PCB;
- a patch antenna disposed on the first surface of the dielectric layer and electrically connected to a first point of the PCB, wherein the patch antenna comprises multiple patches, wherein the multiple patches are arranged to be spaced apart from each other at a regular interval on the first surface of the dielectric layer;
- a conductive plate disposed adjacent to the second surface of the dielectric layer and overlapping with the patch antenna, wherein the conductive plate is connected to a ground on the PCB through a second point spaced apart from the first point; and
- a wireless communication circuit electrically connected to the PCB,
- wherein the wireless communication circuit is configured to feed power to the patch antenna through the first point of the PCB to:
  - transmit and/or receive a first signal of a first frequency band; and
  - transmit and/or receive a second signal of a second frequency band different from the first frequency band through a first electric path comprising the patch antenna, the conductive plate, and the ground.

12. The electronic device of claim 1, wherein the patch antenna is electrically connected to the first point by a conductive connecting member comprising a conductive material.

13. The electronic device of claim 12, wherein the conductive connecting member comprises a conductive via.

14. The electronic device of claim 1, further comprising a shield can having at least partial area disposed adjacent to the dielectric layer,
- wherein the shield can is configured to provide electric shielding for electronic components arranged in a space formed by the shield can and the housing.

15. An antenna structure comprising:
- a printed circuit board (PCB) comprising a ground;
- a wireless communication circuit, comprising processor circuitry, electrically connected to the PCB; and
- an antenna module electrically connected to the PCB,
- wherein the antenna module comprises:
  - a dielectric layer spaced apart from the PCB, wherein the dielectric layer comprises a first surface and a second surface opposite to the first surface and is adjacent to the PCB;
  - a patch antenna disposed on the first surface of the dielectric layer and electrically connected to a first point of the PCB;
  - a conductive plate disposed adjacent to the second surface of the dielectric layer and electrically connected to the patch antenna, wherein the conductive plate is electrically connected to the ground through a second point spaced apart from the first point; and
- a conductive member, comprising a conductive material, extending from the conductive plate and disposed adjacent to the second surface; and
- wherein the wireless communication circuit is configured to feed power to the antenna module through the first point of the PCB to:
  - transmit and/or receive a first signal of a first frequency band through the patch antenna;
  - transmit and/or receive a second signal of a second frequency band through a first electric path comprising the patch antenna, the conductive plate, and the ground, the second frequency band being different from the first frequency band; and
  - feed power to the patch antenna through the first point to transmit and/or receive a third signal of a third frequency band through a second electric path comprising the patch antenna, the conductive plate, the conductive member, and the ground, the third frequency band being different from the first frequency band and the second frequency band.

16. The antenna structure of claim 15, wherein the first frequency band comprises an ultra-wide band (UWB) frequency band, and
- wherein the second frequency band comprises a frequency band lower than the first frequency band.

17. The antenna structure of claim 15, wherein the patch antenna and the conductive plate are electrically connected to each other through coupling, and
- wherein the first electric path comprising the patch antenna, the conductive plate, and the ground is configured to operate as a loop antenna.

18. The antenna structure of claim 15, wherein the patch antenna comprises multiple patches,
- wherein the multiple patches are arranged to be spaced apart from each other at a regular interval on the first surface of the dielectric layer.

* * * * *